United States Patent [19]

Lemmon et al.

[11] 4,333,688
[45] Jun. 8, 1982

[54] MOUNTING ARRANGEMENT FOR DUAL WHEELS

[76] Inventors: Ernest M. Lemmon, P.O. Box 569, Arkoma, Okla. 74901; James P. Pettigrew, 6815 S. 9th St., Fort Smith, Ark. 72901

[21] Appl. No.: 148,462

[22] Filed: May 9, 1980

[51] Int. Cl.³ .............................................. B60B 11/00
[52] U.S. Cl. ............................... 301/36 R; 301/38 R; 411/427; 411/378
[58] Field of Search .......... 301/36 R, 36 WP, 13 SM, 301/38 R, 39 R, 41 R; 411/427, 378

[56] References Cited

U.S. PATENT DOCUMENTS

| 1,428,556 | 9/1922 | Putnam | 301/36 R |
| 3,039,825 | 6/1962 | Clark | 301/36 R |
| 3,454,305 | 7/1969 | Gilmour | 301/36 R |
| 3,532,384 | 10/1970 | Williams | 301/36 R |
| 4,214,792 | 7/1980 | Hardwicke et al. | 301/36 R |

Primary Examiner—H. Grant Skaggs
Attorney, Agent, or Firm—Lowe, Kokjer, Kircher, Wharton & Bowman

[57] ABSTRACT

In a dual wheel arrangement for vehicles, a hub adapter serves to mount a second wheel beside the first wheel. Combination nut and bolt elements are threaded onto the lug bolts for the first wheel. The hub adapter is received on projecting bolt portions of the nut and bolt elements and is secured by nuts. The second wheel is mounted on an outer flange of the hub adapter.

4 Claims, 6 Drawing Figures

U.S. Patent  Jun. 8, 1982  4,333,688
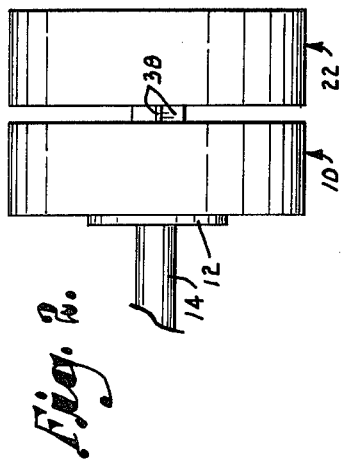
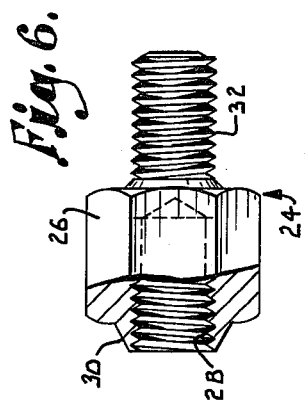
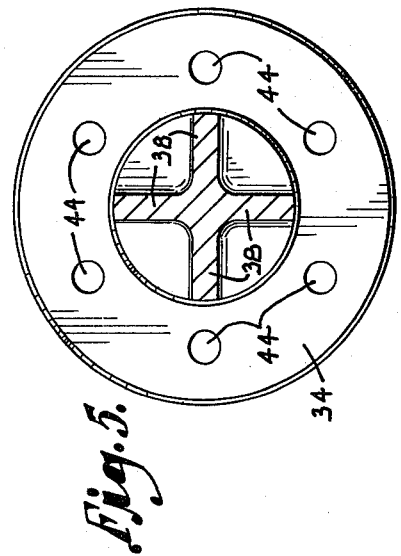
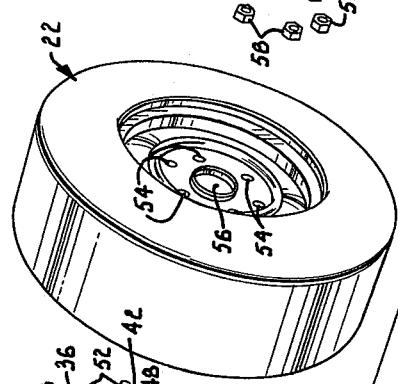
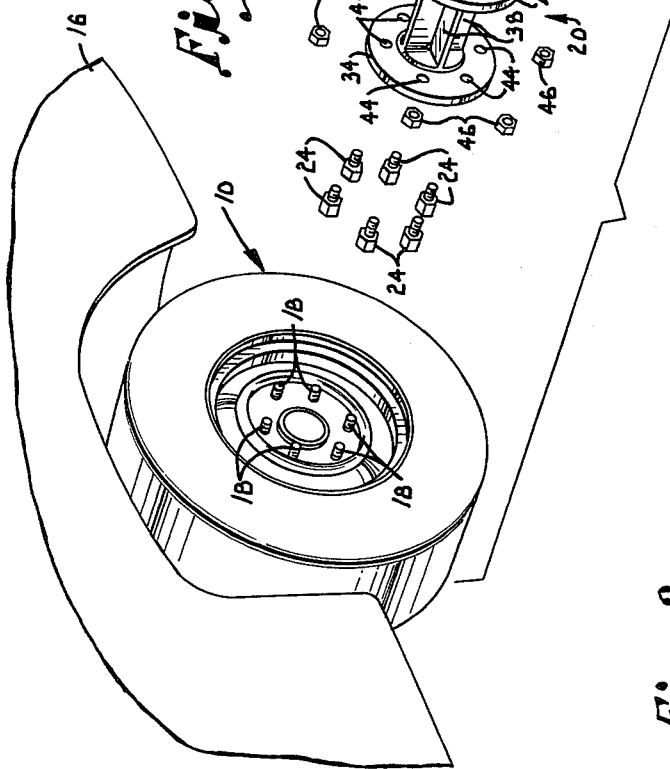
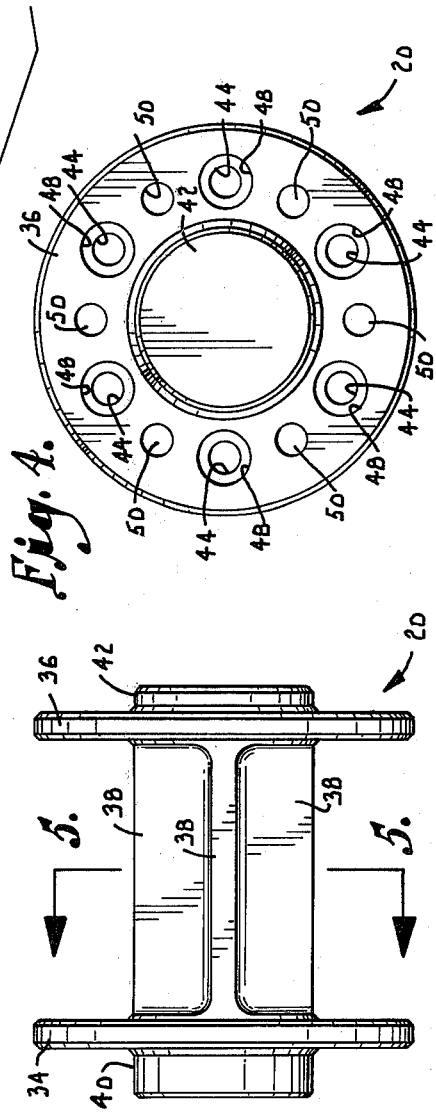

1

MOUNTING ARRANGEMENT FOR DUAL WHEELS

BACKGROUND AND SUMMARY OF THE INVENTION

This invention relates in general to the installation of dual wheels on vehicles. More particularly, the invention is directed to a mounting assembly for mounting a second wheel side by side with a first wheel in a dual wheel arrangement.

Although dual wheels have long been used on a wide variety of vehicles, the manner in which they have been mounted has been less than satisfactory in a number of respects. Perhaps most notably, the mounting arrangements for existing dual wheels are characterized by excessive cost and complexity, due primarily to the need for a number of specially made components. It is common for over sized wheels and other unusual wheels to be required, and these are more costly and less available than standard wheels. Additionally, there are no known dual wheels which permit free rotation or cross switching of the wheels. As a result, the tire life is reduced and the tires can wear unevenly and create significant safety problems. Another problem has been that installation and removal of the wheels requires considerable time and effort and the use of jacks and various types of special tools.

The present invention is aimed at eliminating these and other problems and has, as its principal object, the provision of a simple and economical mounting arrangement for dual wheel of a vehicle.

More specifically, it is an object of the invention to provide a mounting assembly which permits a second wheel to be mounted side by side with the first wheel.

Another object of the invention is to provide a mounting assembly of the character described which utilizes standard parts that are readily available. Only the hub adapter and the combination lug nuts and bolts need to be specially made, and the costs are reduced accordingly.

Still another object of the invention is to provide a dual wheel arrangement in which standard wheels are used. The need for over sized wheels and other unusual wheels is thus eliminated, along with the associated costs and availability problems.

A further object of the invention is to provide a mounting assembly for dual wheels which permits rotation and cross switching of all of the wheels in order to reduce the wear on the tires.

An additional object of the invention is to provide a dual wheel arrangement which permits the wheels to be quickly and easily installed without the need for special tools or other specialized equipment. All that is required for proper installation is a conventional wrench, and even a jack is unnecessary in most cases.

Yet another object of the invention is to provide a mounting assembly for dual wheels which is adapted to fit a wide variety of vehicles. The hub adapter fits virtually any type of vehicle having a standard wheel. In addition, various lug bolt patterns can be easily accomodated, as can variations in the number of bolts.

A still further object of the invention is to provide a mounting assembly of the character described which is constructed in a sturdy manner to withstand the heavy loads that are applied to the vehicle and the rough terrain that may be encountered.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is an exploded perspective view illustrating the manner in which dual wheels are mounted in accordance with the present invention;

FIG. 2 is a fragmentary front elevational view of dual wheels which are installed in accordance with the invention;

FIG. 3 is a side elevational view of the hub adapter which is included in the mounting assembly of the invention;

FIG. 4 is an end elevational view of the hub adapter taken from the right end of FIG. 3;

FIG. 5 is a sectional view taken generally along line 5—5 of FIG. 3 in the direction of the arrows; and FIG. 6 is an enlarged side elevational view of a combination lug nut and bolt included in the mounting assembly, with a portion broken away for purposes of illustration.

Referring now to the drawing in detail and initially to FIGS. 1 and 2, numeral 10 designates a conventional rear wheel which is mounted on a drum 12 carried on one end of an axle 14. The vehicle 16 which is provided with wheel 10 may be an automobile, a camper trailer or any other type of trailer, a small "pick-up" truck, a farm vehicle, or any other type of vehicle. Mounting drum 12 includes the usual threaded lug bolts 18 which project outwardly through openings in the central hub portion of wheel 10.

In accordance with the present invention, a hub adapter 20 is mounted on the lug bolts 18 in order to permit a second wheel 22 to be mounted side by side with the first wheel 10. In place of the usual lug nuts, wheel 10 is secured to drum 12 by a plurality of fastening elements 24, each of which serves as a combination lug nut and bolt. As shown in FIG. 6, each fastening element 24 includes a nut portion 26 which is internally threaded at 28 in order to be threaded onto one of the lug bolts 18. The end of each nut portion 26 is tapered as indicated by numeral 30 in order to project into the openings of wheel 10 which receive bolts 18. An externally threaded shank 32 projects outwardly from nut portion 26 to essentially form an outward continuation of the bolt 18 which receives the combination nut and bolt unit.

The hub adapter 20 includes a circular flange 34 near its inner end and a similar flange 36 near its outer end. The body portion of the hub adapter is formed by four ribs 38 which extend between flanges 34 and 36. Each rib 38 is in the form of a plate extending radially from the center of the hub adapter. A small circular boss 40 projects inwardly from the center of flange 34, while another circular boss 42 projects outwardly from the center of flange 36.

Flange 34 is provided with a series of bolt holes 44 which are arranged in a circular pattern corresponding to the pattern of the lug bolts 18. Openings 44 closely receive the shanks 32 of fastening elements 24 in order to mount the hub adapter to the first wheel 10. Nuts 46 are threaded onto shanks 32 and tightened against the outer surface of flange 34 in order to secure the hub adapter in place. The bolt holes 44 are preferably counter sunk in order to receive tapered portions of lug nuts 46 corresponding to portion 30 of nut 26.

A plurality of tool receiving openings 48 are formed in flange 36 in alignment with the respective bolt holes 44 in flange 34. Openings 48 are considerably larger than bolt holes 44 and, as will be more fully explained, are large enough to receive a wrench or other tool (not shown) which may be used to tighten nuts 46. A plurality of bolt holes 50 are formed in flange 36 in a circular pattern, with one bolt hole 50 located between each pair of openings 48. The bolt holes 50 in flange 36 are thus offset from the bolt holes 44 in flange 34. The outer edge of each rib 38 is located inwardly of all of the openings in flanges 34 and 36 so as not to interfere with the openings.

Threaded bolts 52 (FIG. 1) are extended through bolt holes 50 with enlarged heads of the bolts disposed against the inside surface of flange 36. The central hub portion of wheel 22 has a series of bolt holes 54 through which bolts 52 extend when wheel 22 is installed on the hub adapter 20. Boss 42 fits closely in a central opening 56 in wheel 22. Conventional lug nuts 58 are threaded onto bolts 52 in order to secure wheel 22 to flange 36.

The mounting assembly permits the second wheel 22 to be mounted side by side with the first wheel 10 in order to provide a dual wheel arrangement. To install the second wheel, the vehicle is driven so as to position of wheel 10 on top of a board, a curb, or any other object which elevates the wheel sufficiently. The lug nuts (not shown) which are ordinarily used to secure wheel 10 are removed, and fastening elements 24 are threaded onto the lug bolts 18. The nut portions 26 securely retain wheel 10 against the mounting drum 12. Flange 34 is then fitted on the shanks 32 of fastening elements 24, and nuts 46 are applied to shanks 32 to secure the hub adapter 20 in place. A long handled wrench (not shown) may be inserted through openings 48 of flange 36 to tighten nuts 46. It is noted that flange 34 is recessed somewhat within the rim of wheel 10 and is inaccessible for that reason and also by reason of the relatively small space between flanges 34 and 36. Therefore, the tool receiving openings 48 are important in providing for proper tightening of nuts 46 with a long handled wrench or similar tool.

After bolts 52 have been extended through openings 50, the second wheel 22 is installed and nuts 58 are tightened on bolts 52 to secure the second wheel in place. This completes installation of the second wheel, and the vehicle may then be driven off. Nuts 58 may be the lug nuts which ordinarily are used to secure the first wheel 10.

As shown in FIG. 2, the ribs 38 are long enough to space wheel 22 a short distance outwardly of wheel 10. In addition, the nut portions 26 of elements 24 serve as spacers which space flange 34 outwardly of the central hub portion of wheel 10. Ribs 38 provide the hub adapter 20 with sufficient strength to withstand the heavy loads applied to it and the rough terrain which may be encountered by the vehicle.

The outer wheel 22 may be removed in a quick and easy manner by reversing the steps used to mount it. Again, openings 48 receive a long handled wrench which is extended through openings 48 and applied to nuts 46 in order to facilitate loosening of the nuts. Wheel 10 may be removed in the usual manner. It is thus apparent that the wheels may be rotated or cross switched as desired in order to prevent uneven wear on the tires.

The hub adapter 20 can be installed on virtually any type of vehicle. The bolt holes 44 and 50 can be arranged as required to accomodate different lug bolt patterns and various numbers of lug bolts. The hub adapter 20 may be formed of any suitable material such as cast aluminum which is suitably heat treated for increased strength.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, we claim:

1. Apparatus for mounting a second wheel to a first wheel carried on an axle having a plurality of externally threaded studs projecting therefrom, said apparatus comprising in combination:
   a plurality of fastening elements for fastening the first wheel on the studs projecting from the axle to secure the first wheel to the axle, each fastening element including an internally threaded nut portion on one end adapted to be threaded onto the corresponding stud to secure the first wheel thereon and a solid externally threaded shank on the opposite end integral with said nut portion and projecting outwardly therefrom to provide an outward continuation of the corresponding stud;
   an adapter having a body portion and flat first and second flanges on opposite ends of said body portion, said first flange having a plurality of openings therein for receiving the corresponding shanks of said fastening elements to mount said adapter on said shanks;
   a plurality of nut elements adapted to be threaded onto the externally threaded shanks and against said first flange to secure said adapter on said fastening elements; and
   means for mounting the second wheel on said second flange with the second wheel located outwardly of the first wheel, said mounting means including a plurality of externally threaded bolt members projecting from said second flange and a plurality of nuts adapted to be threaded onto said bolt members to secure the second wheel thereon.

2. Apparatus as set forth in claim 1, wherein each of said first and second flanges has a circular configuration.

3. Apparatus as set forth in claim 1, wherein said body portion of the adapter comprises a plurality of flat ribs each extending continuously between said first and second flanges and intersecting with one another.

4. Apparatus as set forth in claim 3, wherein:
   each rib terminates in an outer edge; and
   each of said first and second flanges has a circular shape and a diameter greater than the distance between the outer edges of said ribs.

\* \* \* \* \*